Aug. 11, 1964　　　M. R. MERRIMAN　　　3,144,560
PHOTORESPONSIVE MONOCRYSTAL SWITCHING SYSTEM
Original Filed Aug. 17, 1954　　　　　　　　6 Sheets-Sheet 1

INVENTOR.

BY

Aug. 11, 1964  M. R. MERRIMAN  3,144,560
PHOTORESPONSIVE MONOCRYSTAL SWITCHING SYSTEM
Original Filed Aug. 17, 1954  6 Sheets-Sheet 2

INVENTOR.

BY

Aug. 11, 1964　　　M. R. MERRIMAN　　　3,144,560
PHOTORESPONSIVE MONOCRYSTAL SWITCHING SYSTEM
Original Filed Aug. 17, 1954　　　6 Sheets-Sheet 3

INVENTOR

BY

ATTORNEY

Aug. 11, 1964   M. R. MERRIMAN   3,144,560
PHOTORESPONSIVE MONOCRYSTAL SWITCHING SYSTEM
Original Filed Aug. 17, 1954   6 Sheets-Sheet 4

INVENTOR

BY

ATTORNEY

Aug. 11, 1964    M. R. MERRIMAN    3,144,560
PHOTORESPONSIVE MONOCRYSTAL SWITCHING SYSTEM
Original Filed Aug. 17, 1954    6 Sheets-Sheet 5

INVENTOR

BY

ATTORNEY

Aug. 11, 1964   M. R. MERRIMAN   3,144,560
PHOTORESPONSIVE MONOCRYSTAL SWITCHING SYSTEM
Original Filed Aug. 17, 1954   6 Sheets-Sheet 6

INVENTOR

BY Strauch, Nolan & Diggins

ATTORNEYS

United States Patent Office 3,144,560
Patented Aug. 11, 1964

3,144,560
PHOTORESPONSIVE MONOCRYSTAL
SWITCHING SYSTEM
Maximillian R. Merriman, Rockaway, N.J., assignor, by mesne assignments, to Hupp Corporation, Cleveland, Ohio, a corporation of Virginia
Original application Aug. 17, 1954, Ser. No. 450,443. Divided and this application July 29, 1958, Ser. No. 833,903
7 Claims. (Cl. 250—211)

This invention is related to a light responsive system and more particularly to a system employing light responsive crystals of a binary compound. This application is a division of my application Serial No. 450,443, filed August 17, 1954, now abandoned.

It is known that photocells may be divided into two classes, the first being made of a material having photoelectric emission whereby photo-electrons are liberated from the surface of the material by the action of light and may be withdrawn by an electric field through an evacuated space and the second class being a photo-conductive cell wherein stimulation by light or other radiant energy modifies the resistivity of the material of the cell. The photo-conductive cell crystals may be made of a semi-conductor material, for example a binary compound such as cadmium sulfide.

This invention relates to an improved arrangement of binary compound crystals to provide a light-responsive cell which has a sufficient difference in its resistivity between the dark and light conditions and sufficiently high current carrying capacity when stimulated by radiant energy to permit its use in electrical circuits directly with electromagnetic relays thereby eliminating the necessity of providing special operating voltages for vacuum tubes and transistors. The cells also can be used in cooperation with vacuum tubes and transistors in electrical control circuits.

It is an object of this invention to provide a circuit in which a crystal of a binary compound is connected in series with a source of current and a load device and with the crystal responsive to light to vary the resistance of the circuit and thereby vary current flow in the circuit.

It is another object of this invention to provide a circuit in which a plurality of crystals of a binary compound connected in parallel circuit relation to form a light sensitive cell are connected in series with a source of current and a load device and with the cell responsive to light to vary the resistance of the circuit and thereby vary current flow in the circuit.

It is a further object of this invention to provide a pair of light sensitive cells in a bridge network connected to an electron tube amplifier and with the pair of cells simultaneously energizable by light to control the amplifier.

It is a further object of this invention to provide light amplifying means in which a first photo-responsive cell energizable by light actuates means to effect energization of a second photosensitive cell by light in response to the energization of the first cell by light.

It is a still further object of this invention to provide a unitary amplifying structure comprising a photo-responsive cell housed in a body and with associated components of the amplifier hermetically sealed in the body of the housing material.

These and other objects of this invention will become more fully apparent by reference to the appended claims and as the following detailed description proceeds in reference to the accompanying drawings wherein:

Figure 1:
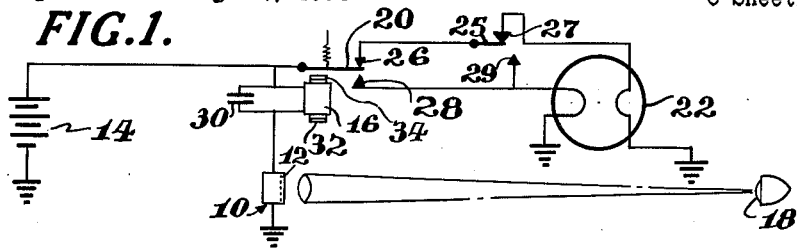
FIGURE 1 is a schematic wiring diagram of the invention applied to a headlight dimmer.

As is shown in FIGURE 1, a light responsive cell 10 formed as a crystal 12 of a binary compound, preferably cadmium sulfide, is connected in series with a battery 14, and a load device, such as an electromagnetic switch 16. When the crystal becomes suitably illuminated by a source of light, indicated diagrammatically at 18, the internal resistance of the illuminated cell becomes very much lower than it was when the cell was dark so that the circuit resistance becomes low enough to permit enough current to flow to properly actuate the switch 16.

As is described more fully hereinafter, the cell 10, is formed of a single plate of cadmium sulfide or of a plurality of active surfaces of cadmium sulfide connected in parallel circuit relation so that the cell has a relatively low resistance when suitably illuminated and has adequate current carrying capacity so that in many possible applications of the cell it may be directly connected to a relay, or the like. The cell 10 of cadmium sulfide also has its response to radiations in the vicinity of white light with a maximum response at 5200 angstroms.

The cell 10, may as described more fully hereinafter, be applied to be responsive to the light from headlight of an automobile remote from an automobile carrying the cell 10 as a detector, and then the electromagnetic switch 16, is provided with an armature 20, movable to switch headlights 22, connected to the battery 14, from a bright or high beam condition to a dim or low beam condition through movement of the armature into engagement with a contact 28. The coil of the electromagnetic switch may be shunted by a capacitor 30, and a core 32 of the coil may be provided with a band 34 of copper in a conventional manner so that the switch becomes a delayed-action device when the current is reduced in the coil in a manner well known in the art.

Should it be desired to retain manual control of the dimming of the headlights of the detector car in the event of the failure of the light-responsive dimming means to respond to the light from an oncoming car during a snowstorm or other adverse weather conditions, then a foot operated pedal switch arm 25, in series with the bright filament of the headlight is normally in contact with a contact 27, but is movable at will to engage a contact 29, and so switch over the battery 14, to the low beam or dim filament of the headlight.

Figure 2:
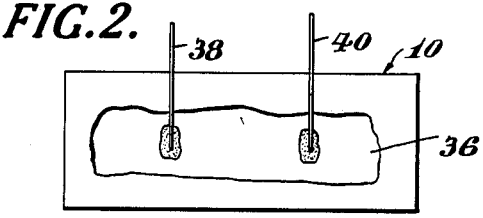
FIGURE 2 is a view of a photo-responsive single crystal cell and its connecting wires.
Figure 3:
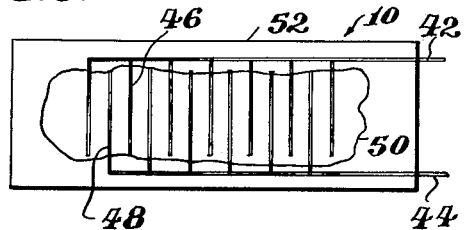
FIGURE 3 is a view of a photo-responsive single crystal cell and its connecting wires arranged in a modified form.
Figure 5:
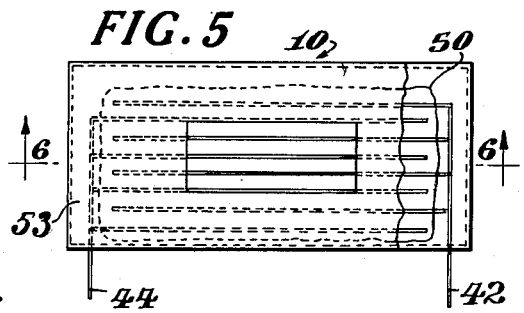
FIGURE 5 is a top view of a shielded photo-responsive single crystal cell assembly with parts broken.
Figure 6:
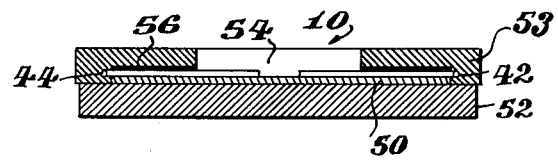
FIGURE 6 is a sectional view of lines 6—6 of FIGURE 5.

The light responsive binary compound cell 10, may, in one form, be a small plate crystal 36 of the cadmium sulfide or another suitable binary compound, as shown in FIGURE 2, with wires 38, and 40, connected thereto by a conductive cement. The entire crystal unit comprises merely a single crystal 36 of photosensitive material suitably supported as on a slab of non-conducting material. The crystals are generally flat and quite thin as illustrated at 50 in FIGURES 5 and 6. The proportions of crystal 50 are shown approximately four to eight times larger than the actual size of the crystals that are used. A preferred form is shown in FIGURE 3, in which a pair of main conductors 42 and 44, are each connected by a plurality of thin conductors 46 and 48, respectively, which extend along the minor dimension of an elongated plate crystal 50, and are suitably connected thereto by being painted, sputtered, or evaporated thereon, or otherwise electrically connected to the crystal by conventional means, so that the cell is, in effect, formed of a plurality of active binary compound surfaces connected in parallel circuit relation. It may be convenient to think of the main conductors 42 and 44, as the "backs" of a comb-like structure with normally extending conducting fingers formed by the thin conductors 46 and 48.

The plate crystal 50, is suitably mounted on an insulating support 52. The plate crystals are preferably prepared from a powder of cadmium sulfide by a process and with the apparatus disclosed and claimed in application for Letters Patent of the United States, Serial No. 329,973, filed on January 7, 1953, by Leonard E. Ravich, for Semi-Conductor Improvements and Devices for Use of Same, now abandoned. In the event that detailed information as to the structure and mode of formation of such crystals is found to be necessary to a complete understanding of the invention herein, reference is made to such prior application. The crystals are transparent, and photons of light enter the body of the crystals to bring about a redistribution of the current carriers in the body. In other words, the effect of the photons is not limited to a surface effect at the face of the crystal.

Figure 4:
FIGURE 4 is a view of a photo-responsive single crystal cell and a further modified arrangement of the connecting wires.

In the cell form shown in FIGURE 4, the conducting fingers 46 and 48 are disposed along the major axis of the plate crystal 50. In the cell form shown in FIGURES 5 and 6, the crystal 50 is housed in a housing 53, of glass or of a synthetic resin, and the housing is provided with an upper central transparent portion 54, which may be integrally formed to define a suitable lens such as a Fresnel lens or an aperture into which such a lens may be cemented in the housing. The central portion 54 defines the "viewing" area of the crystal 50, and the bounding areas are covered by opaque masking means, indicated at 56, which may be provided by the insertion of a masking plate or by simply depositing an opaque material on the crystal.

Figure 7:
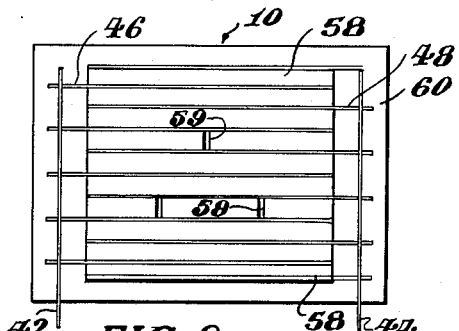
FIGURES 7 and 8 are views of assemblies of photo-responsive plural crystal cell units and their connecting wires.

In the cell form shown in FIGURE 7, the cell is formed of an assembly of narrow plate or of needle crystals 58, and the conducting fingers 46 and 48, connected to the main leads 42 and 44, respectively, are provided by depositing a conductive paint between and in electrical contact with adjacent opposed faces along the length of the crystals. Conducting fingers 46 and 48 may, if desired, be small conducting wires electrically connected along opposite sides to the adjacent crystals between which it is interposed. In this way there is again provided an assembly of active elements connected in parallel circuit relation so that the assembly has a high current capacity, and has a low resistance incident to connecting resistor units in parallel. The needles are not necessarily all of the same length for it may happen in the production of the needles of cadmium sulfide that all needles are not of the same length. Breaks in the needle length are shown at 59. The needles are suitably secured to an insulating base 60.

Figure 8:
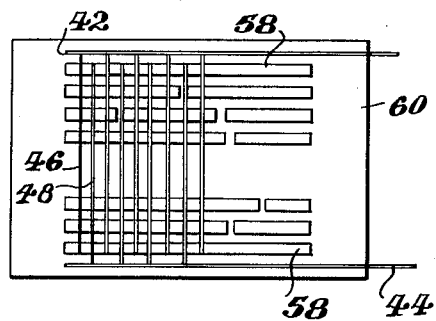

In the cell form shown in FIGURE 8, the parallel rows of needles are spaced apart and are suitably secured to an insulating base. The conducting fingers 46 and 48 now connect active sections of each needle in parallel and connect all of the active sections of the assembly in parallel.

Cells formed in accordance with the principles of the cells shown in FIGURES 3 to 8, provide a cell having a high current carrying capacity when stimulated by radiation and practically infinite resistance in the absence of such stimulation. Specifically, cells have been constructed having zero dark current and as high as one milliampere current when connected in series with a relay across a six volt D.-C. battery and illuminated by a light having an intensity equivalent to the intensity of the headlights of an oncoming car at a distance of approximately 150 yards.

Figure 9:
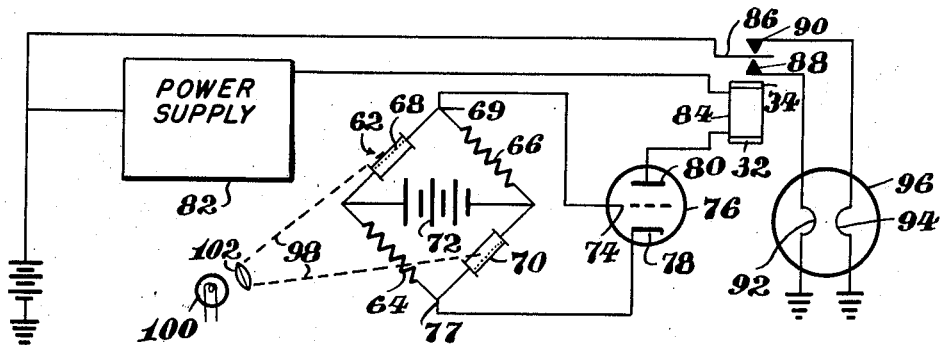
FIGURE 9 is a schematic showing of a bridge circuit arrangement of photo-responsive crystals and resistors and associated circuit elements.

In one application of the binary compound cell 10, a bridge network 62, FIGURE 9, comprises opposite arms formed of resistors 64 and 66, respectively, and opposite arms formed of radiation responsive cells 68 and 70, respectively. The network is energized by a battery 72, as shown. The junction 69 of the cell 68 with the resistor 66 is connected to a control grid 74 of a triode amplifier tube 76, and the junction 77 of the cell 70 with the resistor 64, is connected to a cathode 78 of the triode 76. An anode 80 of the tube is connected to a power source 82 in series with an electromagnetic switch 84, which has an armature 86 movable to engage a contact 88 or a contact 90, to switch in a low beam lamp 92, or a high beam lamp 94, respectively, of a headlight 96 of an automobile, or to selectively switch in other load devices. As is diagrammatically shown by the broken lines 98, the cells are arranged to be simultaneously responsive to light from a lamp 100, through a suitable light focussing means 102. When the cells 68 and 70 become illuminated by the light source 100, which may be the headlights of an approaching automobile, the arms of the network in parallel with the battery 72, become more conducting because of the decrease of the internal resistance of the cells in response to the light, and the control grid, which was originally at a low D.-C. potential is now driven positive by the voltage drop in the resistor 66. The cathode which is normally held at a relatively high positive condition now goes more negative as the cathode circuit begins to conduct, and the two effects just described act in the same way to increase the grid bias in a positive direction to make the triode amplifier conduct, and so result in the switching over of the switch 84 from the high beam to the low beam.

Figure 10:
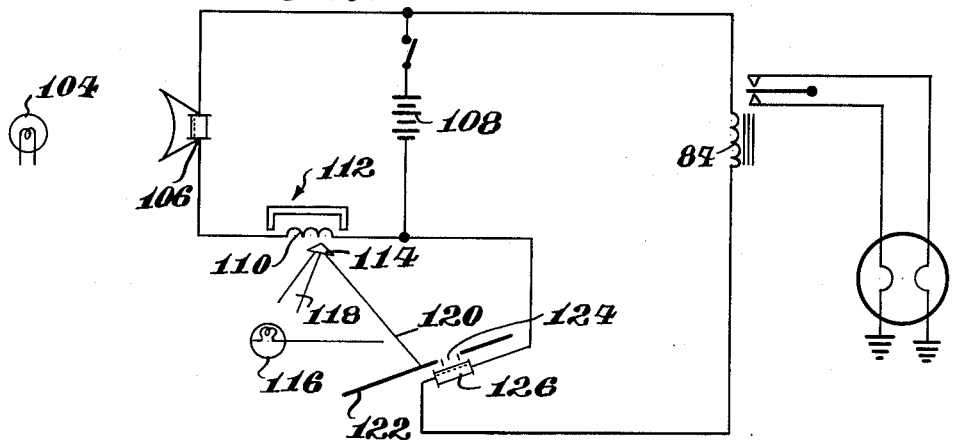
FIGURE 10 is a schematic showing of a light amplifier and the associated circuit elements.

In another application of the binary compound cell 10, and shown in FIGURE 10, a first light source 104, is adapted to illuminate a first photo-responsive cell 106, which is connected in series with a battery 108, and the movable element 110, of a conventional mirror galvanometer, indicated generally at 112, and carrying a suitable light reflecting means, indicated at 114. A second light source 116, directs light onto the reflecting means 114, through suitable focussing and directing means, indicated at 118, and a beam of light, indicated by the line 120, is projected onto a suitable light barrier or mask 122. The barrier is provided with a slot or aperture 124, and when the movable element 110, swings in response to the illumination of the cell 106, the beam of light passes through the aperture to illuminate a second photo-responsive cell 126. The cell 126 is connected in series with the battery 108, and an electromagnetic switch 84, to function in the manner described in connection with FIGURE 9.

It will be understood that the applications described in connection with FIGURES 9 and 10 are not by way of limitation, and that the divided circuit arrangement of FIGURE 9, and the light amplifier of FIGURE 10 are not restricted in their application to light dimming means.

Because the cadmium sulfide cell is well adapted for operation in low voltage circuits such as those energized by the conventional starter battery of an automobile, and because of its characteristics in having a relatively high dark-to-light ratio, it is peculiarly adapted for use in an amplifying combination with transistors of the relatively inexpensive type having amplification factors of around 20. The cadmium sulfide cell has a substantial amplifying effect that is commonly called a "cascade effect," that is, for each quantum of introduced energy many thousands of electrons can be emitted in the form of a photo-current.

Because this cell operates satisfactorily on low biasing voltages, while other crystals and other photo-sensitive units known to us requires high biasing voltage, this cell lends itself advantageously for use in combination with transistors adapted for use in low voltage circuits. The term "dark" is used as it is used by those familiar with the art, and does not mean an entire absence of light, but, rather, light of low intensity and below the threshold intensity. The term "light" is not used in a limiting sense, but includes all electromagnetic waves of usable frequency or wave length.

Figure 11:
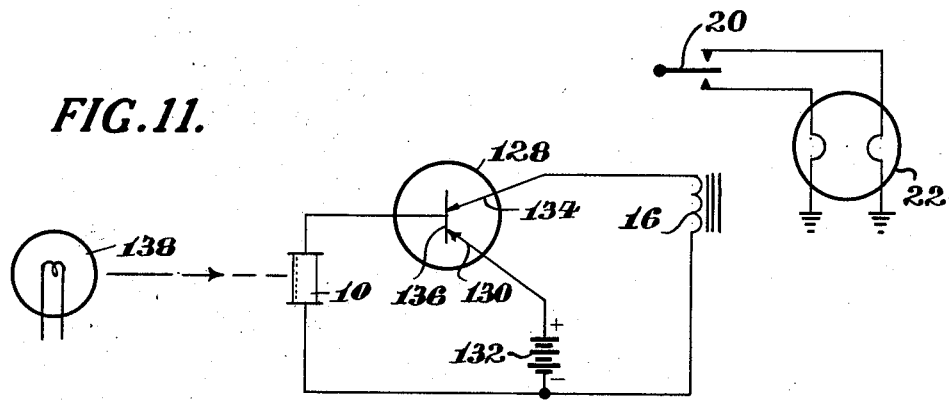
FIGURE 11 is a schematic showing of an amplifier comprising a photo-responsive crystal and a transistor.

In FIGURE 11, there is shown an amplifier in which a transistor 128, has one contact 130, connected to a battery 132, and an output contact 134, connected to an electromagnetic switch 16, similar to that described in connection with FIGURE 1. A base electrode 136, is connected through a photo-conductive cadmium sulfide cell 10, and then to the battery 132. The cell is responsive to light from a source 138.

Figure 12:
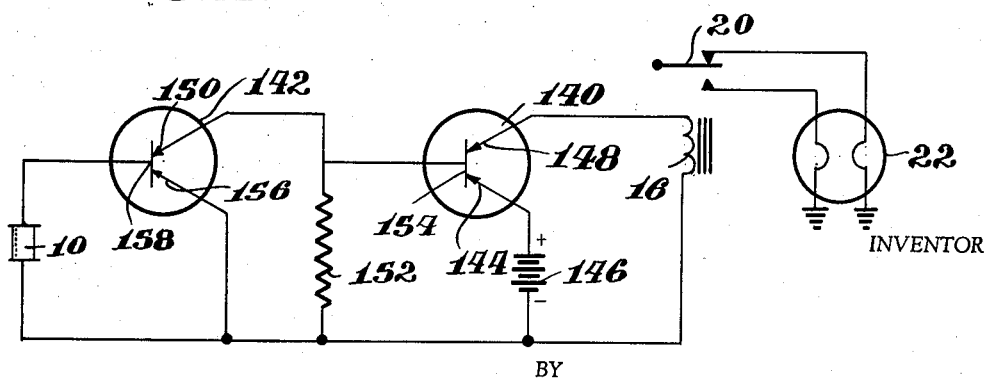
FIGURE 12 is a modification of the circuit in FIGURE 11 in which two transistors are employed.

In FIGURE 12 there is shown an amplifier in which two transistors 140 and 142, respectively, are connected in cascade and cooperable with a light responsive cadmium sulfide cell 10. An emitter electrode 144 of the transistor 140 is connected to the positive pole of a battery 146, and a collector electrode 148 is connected to an electromagnetic switch 16, similar to that already described. An emitter electrode 150, of the transistor 142, is connected through a resistor 152 and back to the battery 146, and the electrode 150 is also connected to a base electrode 154 of the transistor 140. A collector electrode 156 of the transistor 152, is connected to the negative pole of the battery, and a base electrode 158, of the transistor 142, is connected to the negative pole of the battery through a light responsive cadmium sulfide cell 10. The cell 10, is responsive to a light source, not shown.

Figure 13:
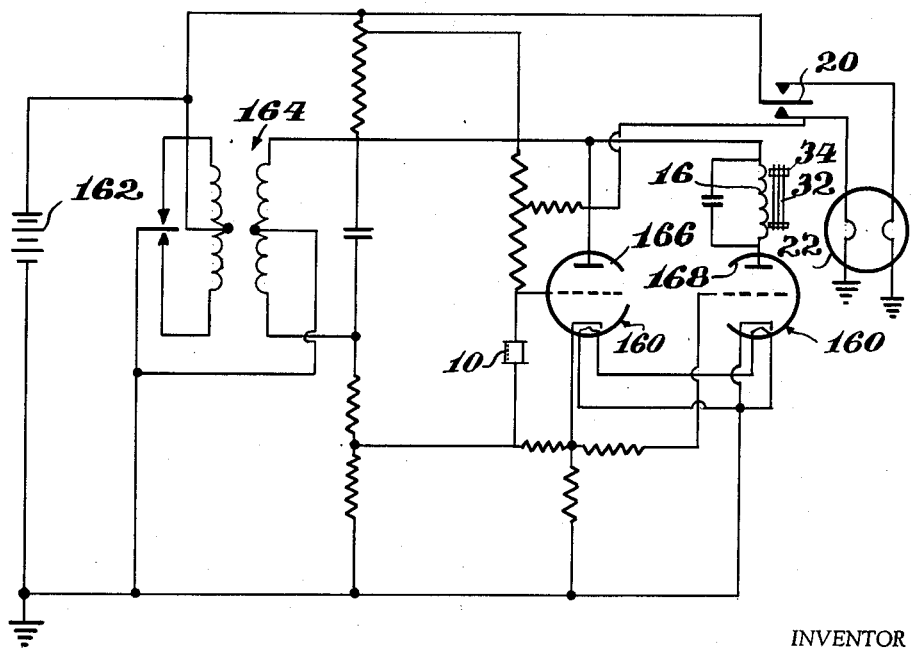
FIGURE 13 is a schematic showing of a photo-responsive cell and an electron tube in an amplifier.

As is shown in FIGURE 13, a cadmium sulfide cell 10 may be employed with a dual triode amplifier tube 160 in a known circuit, which derives its operating voltage from a battery 162, such as is conventionally used on automobiles, and through a conventional vibrator assembly 164, such as is used on an automobile to supply power to a radio receiver, and the crystal assembly of the cell 10, is inserted in the grid-cathode circuit of a first half 166, of the tube, and an electromagnetic switch 16, similar to that already described, is inserted in the anode circuit of the second half 168, of the tube to control the headlights.

Figure 14:
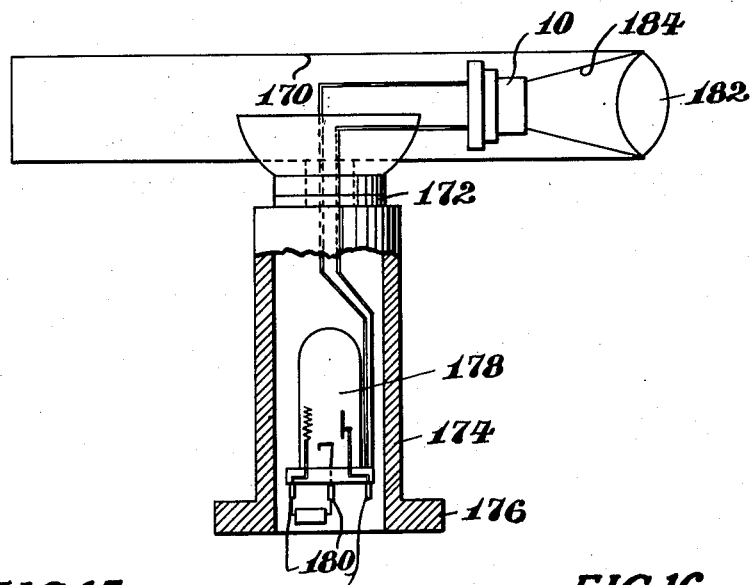
FIGURE 14 is a view in elevation of a light responsive device with parts in section and parts broken.

As shown in FIGURE 14, a cadmium sulfide cell 10, is mounted in a member 170, which is carried on swivel joint means 172, on a tubular member 174, provided with a base flange 176. An amplifying tube 178, is connected in circuit with the cell 10, and wires 180 extend outwardly for connection to a power source and to a load device. The member 170, carries a focussing lens 182, and an annular wall with an inwardly converging surface defines a shield and light guiding means 184.

Figure 15:
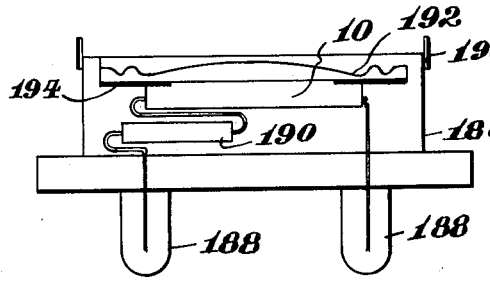

The cadmium sulfide cell 10, may be conveniently housed in a housing 186, of a material such as "Lucite," as shown in FIGURE 15, and with the housing carrying metallic connecting pins 188, so that they may be readily inserted in a conventional socket. A resistor 190 is embedded in the wall of the housing and is connected in series with the cell 10, so that matched units may be assembled of substantially similar total resistance under given condition to facilitate the interchanging of units in circuit lay-outs. The top of the housing is recessed to receive a lens 192, which may be a Fresnel lens as shown, or may be a high speed lens of about 7/8 of an inch focus when the assembly is used in connection with a headlight dimmer switch. The housing 186, is preferably formed of a suitable synthetic resin having insulating qualities such as the acrylic resin "Lucite."

When the cell 10, in the assembly shown in FIGURE 15, or in a comparable assembly, is used as a light detector on an automobile to respond to the light received from the headlights of an oncoming car and dim the headlights of the detecting car, the beam of light from the oncoming car will travel across the viewing area of the cell 10, and finally pass out of the view of the cell when the oncoming and detecting cars are passing each other, or are so close that they may restore their headlights to full brilliancy without creating a hazard. Masking means 194, are placed on the assembly shown in FIGURE 15, to define the viewing area of the cell 10, and so determine approximately at what distance between the oncoming and the detecting cars the beam of the oncoming car will pass clear of the cell, so that the detecting means on the detecting car may de-energize the electromagnetic switch 16, with due allowance being made for the functioning of delay means, hereinbefore described, in delaying the return of the headlights to high beam or to increased brilliancy.

An annular shield 196, may also be placed adjustably on the housing 186, to assist in defining the path of travel of the light beam from the oncoming car when the housing is mounted stationarily on a car.

When the cell is movable on the assembly shown in FIGURE 14, its position may be manually adjusted, but the masking means 194, and the shield 196, tend to give an assembly calling for least movement of the assembly of FIGURE 14, to meet most driving conditions.

Figure 16:
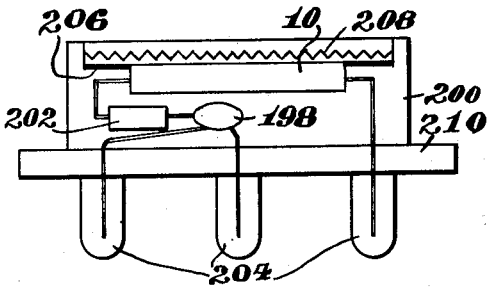

In the cadmium sulfide cell and transistor amplifier assembly shown in FIGURE 16, a transistor 198 is embedded in the body of a housing 200, of "Lucite" or other suitable material, and the transistor is connected in series with a resistor 202, also embedded in the body of the housing, and connected to the cell 10. Connecting pins 204, are carried by the housing 200, and connected to the circuit element as shown, so that the assembly may be removably connected to a conventional plug socket. Masking means are indicated at 206, and a lens 208 is provided which may be cemented, or otherwise held in a recess in the housing 200. The pins 204 may be carried on a base portion 210, of one material while the housing 200, is of another material secured to the base 210, or the base and the housing may be integral, depending upon manufacturing facilities.

Figure 17:
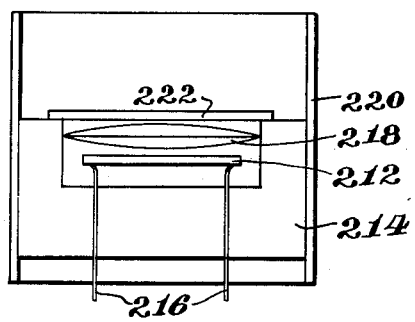
FIGURES 15, 16 and 17 are schematic views of light responsive assemblies.

As is shown in FIGURE 17, a crystal 212 of cadmium sulfide is mounted in a small hollow body 214, of glass, and is held supported by its circuit wires 216. A high speed lens 218, of a focal length of about 7/8 of an inch forms the closure for the body and is fused to the body or otherwise secured to the body to provide a hermetic seal. The receptacle thus formed is filled with argon, or the like, or is exhausted of air so that there is nothing in the chamber to adversely affect the cell. A light shield 220, prevents light from entering the body in an undesired direction, and limits the view of the cell as to direction. The cadmium sulfide is yellow in color so is inherently a filter, and in some applications of the cell it is desirable that a filter 222 be provided to render the cell insensitive to ultra-violet rays.

The response of the cadmium sulfide cell reaches its peak at 5200 angstroms, so, as already mentioned, it has inherent light filtering properties. The cell 10, may be formed of crystals of other binary compounds such as cadmium selenide, cadmium telluride, zinc sulfide, zinc selenide, and zinc telluride. Cadmium sulfide is generally preferred because it has a low response to changes in temperature, and this is particularly desirable when the cell is applied to the light dimming control of an automobile. It is advantageous to keep the current through the crystal below certain limits to prolong the life of the crystal, and, generally, their rating should not be more than one watt. Being a semi-conductor and having the properties of a rectifier to some extent the cadmium sulfide cell does show a preference as to polarity of the biasing battery for maximum sensitivity, but the difference in response with differences of polarity is not marked enough for particular mention in the application of the cell in the light dimming application where the sensitivity of the cell is usually ample with either polarity of the battery.

Figure 18:
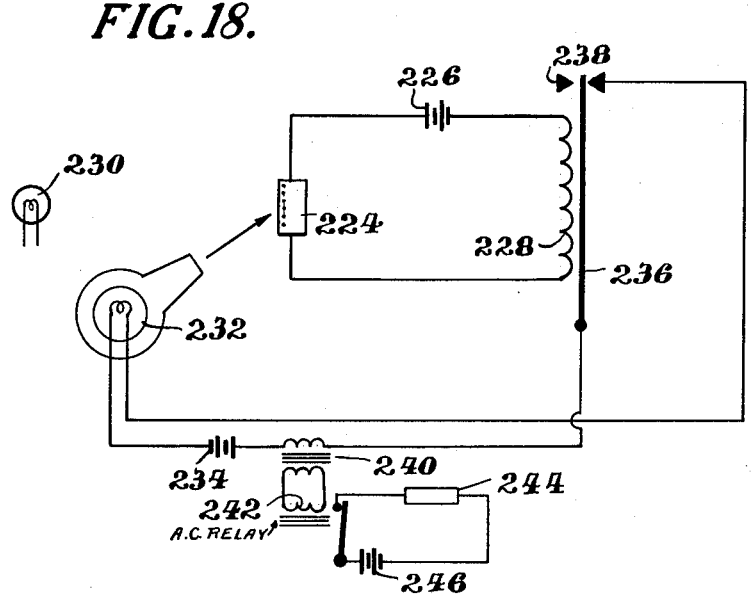
FIGURE 18 is a schematic showing of a light biasing means and the connected circuit elements.

In some applications of the cell 10, under the condition in which the light received by the cell from a remote source of light is of low intensity and in which it is desirable initially bias the cell by light from a local source so that the cell is conditioned to operate on that part of its light intensity versus cell resistance curve to give a favorable response to the light of low intensity from the remote source, then the embodiment shown in FIGURE 18 is employed. A cell 224 is connected in series with a battery 226 and a relay 228, and the cell is adapted to receive light from a remote source 230. A low intensity local source of light 232 is adjustably positioned adjacent the cell 224, and receives current from a source 234. When the total light reaching the cell 224, is adequate to operate the relay 228, the relay moves an armature 236 to interrupt the local circuit of the biasing lamp. The relay may also be provided with a contact 238 to close a load circuit, or the like.

It is possible under some conditions that the cell 224, will be conductive enough under the light from the remote source to hold the relay closed after the biasing lamp has been extinguished or after its effectiveness as a biasing source has been removed by other suitable means than the simple arrangement just described. However, under certain conditions the light from the remote source may not be of sufficient intensity to hold the relay closed after the effect of the biasing light source has been removed, and then the system will "hunt" or oscillate, that is, the biasing lamp will be intermittently switched on and off. A transformer 240, inserted in the circuit of the biasing lamp may be connected to a suitable amplifier to indicate the presence of the weak light from the distant source in the hunting of the system, and when it is desired to hold a load circuit closed in response to the presence of remote light, the relay 228 can be of a type that has low inertia and close setting so that the frequency of the interruptions in the biasing lamp circuit is high enough to hold a conventional A.-C. relay 242, in inductive relation with the current of the biasing lamp through the transformer 240, or connected in parallel with the lamp through a capacitor. The A.-C. relay may be connected to a load device 244 and a battery 246 in a conventional manner. The A.-C. relay is of the conventional type used in alternating current circuits to hold an armature when the relay is energized by pulsating or alternating current.

Further applications of the cell 10 in a photo-sensitive relay circuit are shown in FIGURES 19 through 23 wherein circuits are disclosed having a photo-conductive cell of a binary compound type which preferably may be cadmium sulfide included in the feed back loop of the oscillator utilizing either vacuum tubes or transistors. The resistance of the cell will change in proportion to light impingement and will therefore directly or indirectly control the loop gain of the amplifier to cause the amplifier to change from an oscillating to a non-oscillating condition or vice versa. This feature of the invention is disclosed and claimed in the above identified application of Stockman.

Figure 19:
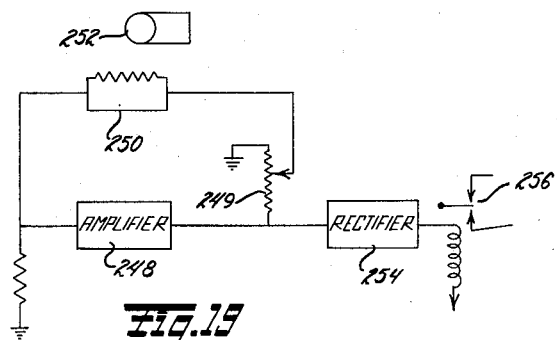
FIGURE 19 shows a block diagram of a photo-conductive cell in a feed back loop in an amplifier.

FIGURE 19 is a diagrammatic representation of a circuit employing this principle and includes an oscillator loop comprising amplifier 248, load resistor 249 and photo cell 250. The reception of light from light source 252 by cell 250 will decrease the resistance of the cell thereby increasing the amount of feed back to a level allowing the system to oscillate. The resulting oscillations will then be rectified by the rectifier 254 and the rectified current will actuate relay 256.

Figure 20:
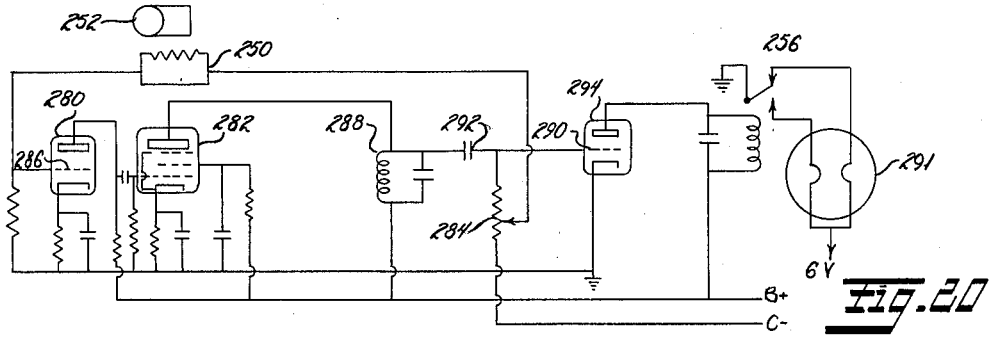
FIGURE 20 is a detailed circuit of FIGURE 19.

FIGURE 20 shows the details of an embodiment of such a system. Amplifying tubes 280 and 282 of the circuit are connected to oscillate if there is sufficient feed back from output potentiometer 284 connected through capacitor 292 to the parallel resonant tank circuit 288 to the grid 286 of tube 280. The output from the plate circuit of tube 280 is connected to the grid of tube 282 and the output from the tank circuit 288 is coupled to the potentiometer 284, the top of which is connected through the light sensitive cell 250 back to the grid 286 of tube 280. Other particular amplifying circuits can obviously be used that will oscillate when the feed back is properly adjusted.

With no light impinging on cell 250, potentiometer 284 is adjusted so that there is insufficient feed back to cause tubes 280 and 282 to oscillate. Potentiometer 284 can be adjusted so that the change in resistance of photo-cell 250 when light impinges thereon is sufficient to increase the feed back to the point of where tubes 280 and 282 will oscillate. There is sufficient alternating current voltage developed in tank circuit 288 when tubes 280 and 282 are oscillating so that when this alternating current voltage is applied through capacitor 292 to grid 290, the positive pulses overcome the bias through potentiometer 284 from the C-terminal and tube 294 will be made to conduct. Since tube 294 conducts in response to the postive pulses only, it effectively functions as a rectifier. A capacitor 295 functions to hold the relay 256 during the portion of the cycle tube 294 is cut off. The contacts of the relay 256 may be connected to the bright and dim filaments of a headlight 291 of an automobile as discussed in connection with FIGURE 1.

Figure 21:
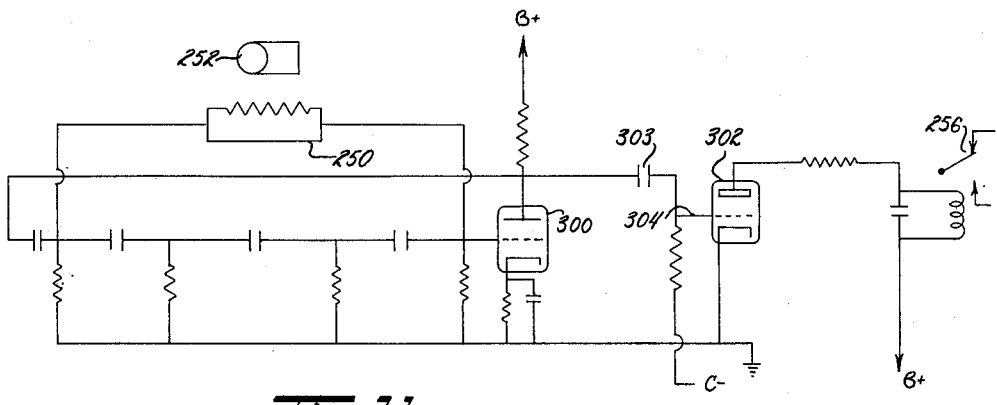
FIGURE 21 is a modification of a detailed circuit of the system of FIGURE 19.

FIGURE 21 shows a further detailed circuit for the schematic diagram of FIGURE 19 utilizing a conventional phase shift oscillator 300 and rectifier 302. The photo-conductive cell 250 is connected in the feed back circuit thereby influencing the conditions for oscillation in the tube 300. The positive pulses of the oscillations are fed from the plate circuit of tube 300 to grid 304 through capacitor 303 to cause tube 302 to conduct and energize the relay. When no light is applied to cell 250, tube 300 either does not oscillate or the oscillations are of another frequency and are of such small amplitude that tube 302 does not conduct therefore causing the relay to remain de-energized. This circuit can also be used as a "frequency-shift" circuit by replacing the rectifier tube 302 with a frequency discriminator and adding a D.-C. amplifier between the discriminator and the relay.

Figure 22:
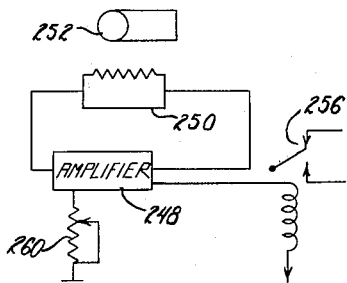
FIGURE 22 is a modification of FIGURE 19 omitting the rectifier.

FIGURE 22 is a diagrammatic representation of a circuit similar to FIGURE 19 but employing a more sensitive relay 256. In this case the relay is operated directly from the oscillator or amplifier tube without the need for a rectifier. The change in the D.-C. plate current of the tube or tubes that accompanies the shift from an oscillating to a non-oscillation condition or vice-versa will actuate the relay.

In order to achieve maximum sensitivity the amplifier 248 may be provided with a gain control 260 so that the loop gain may be adjusted to a value where it takes only a small reduction in the resistance of the photo-cell 250 to start oscillations. Therefore even a very weak light will actuate the relay. The amplifier 248 may be stabilized by the usual procedures, which may include negative feed back to make possible the no signal (i.e., no light) operating point very close to the oscillation threshold. This renders the device even more sensitive to weak light signals from source 252. The rectifier 254 and relay 256 in FIGURE 19 may also be adjusted to have a similar sensitivity.

In these modifications it is noted there is substantially no D.-C. current flowing through the conductive cell which adds stability to the circuit and at no signal operating point there is no voltage applied to the crystal. Using the principle described above, an A.-C. amplifier instead of the D.-C. amplifier normally used in photo-cell circuits can be employed. This is particularly advantageous when a high amplifier gain is necessary.

Figure 23:
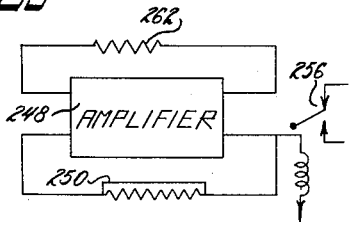
FIGURE 23 is a further modification of FIGURE 22.

FIGURE 23 is a diagrammatic representation of a further modification of the above discussed circuit. Cell 250 in FIGURE 19 may be replaced with a resistor 262 allowing sufficient feed back to make the system oscillate under a "no light" condition. The photo-cell 250 is then inserted in an independent negative feed back loop which stops the oscillation by increasing the negative feed back upon exposure to a sufficient radiation. This modification may be advantageous under certain conditions.

Figure 24:
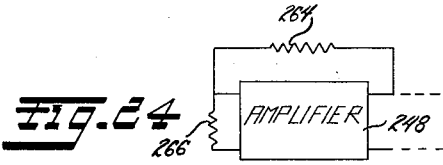
FIGURE 24 is a schematic circuit to show a characteristic of the circuit disclosed in FIGURE 23.

An important characteristic of this circuit can be demonstrated by the diagrammatic representation of FIGURE 24. The photo-conductive cell is replaced by resistor 264 the value of which is exactly equal to that of a cell for the condition where the amount of feed back is just sufficient to make the circuit oscillate. For this condition we have $$\frac{R_1}{R_2} = G$$

where $R_1$ and $R_2$ are the values of resistors 264 and 266 respectively, and G is the voltage gain of the amplifier 248. Because an A.-C. amplifier can be used, it is easy to make G large, which means that $R_1$ can be large compared with $R_2$.

Employing this principle it is possible to obtain a circuit which eliminates the difficulties encountered in the use of a low gain D.-C. amplifier, where the load has to be more or less correctly matched to the cell in order to produce a sensitive system. In employing the principle described herein the load resistors can be a fraction of the cell resistance (1/10, 1/100 or even smaller) without any reduction in sensitivity. If the amplifier in the disclosed circuit utilizes transistors instead of vacuum tubes the resistance 266 represents the input impedance of the amplifier.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A light responsive system comprising a first circuit in which a light responsive cell, a battery and a first relay are in series circuit relation, a second circuit comprising a biasing light source, a source of current, and a switch in series circuit relation, said biasing light source being disposed adjacent said cell to provide a light intensity additive to light on said cell from a remote source and being of a light intensity not sufficient alone to cause said relay to be adequately energized by said cell and said battery in said first circuit, said switch being operable by said relay, and a third circuit in coupled circuit relation with said second circuit and responsive only to a pulsating current in said second circuit.

2. A light responsive system comprising a first circuit in which a battery, a relay, and a light responsive cell are in series circuit relation, means to selectively condition said cell for response to light of low intensity from a remote source, said means comprising a biasing light source disposed adjacent said cell and to provide a light intensity on said cell additive to that of the intensity of light from a remote source, a source of current connected to said biasing light, means to selectively interrupt light from said biasing light source, and means responsive to said interrupting means to control a load circuit.

3. A light responsive circuit comprising a load device, a source of power, and a light responsive means having a pair of electrodes connected in series circuit relation between said source of power and said load device, said light responsive means consisting solely of a single plate-like monocrystal of cadmium sulphide having a pair of substantially flat surfaces larger than any of the other surfaces, a plurality of parallel conductive strips on one of said flat surfaces, a body of insulating material secured to the opposite one of said flat surfaces, means for connecting alternate ones of said strips to one of said pair of electrodes and for connecting strips in between said alternate strips to the other of said pair of electrodes to thereby provide a plurality of light responsive portions of said monocrystal connected in parallel circuit relation to thus cause actuation of the load device upon illumination of said light responsive means without further amplification of the current passed by said light responsive means.

4. The circuit as defined in claim 3 wherein said load device comprises an inductive winding energized solely by the photocell current.

5. In combination, a body of insulating material having a flat surface, an elongated photoresponsive cadmium sulphide monocrystal having a pair of substantially flat surfaces that are parallel to each other and larger than the other surfaces on said monocrystal, means mounting one of said larger surfaces of said monocrystal to the flat surface of said body, first and second common conductors mounted to said body and disposed along opposite sides of said monocrystal, a first plurality of spaced conductors extending across and in contact with the other of said monocrystal larger surfaces and connected at one end to said first common conductor, and a second plurality of spaced conductors each located between adjacent ones of said first plurality of spaced conductors and extending across and in contact with the other of said monocrystal larger surfaces and connected at one end to said second common conductor.

6. The combination as defined in claim 5 wherein the conductors forming said first and second plurality of conductors are directed substantially perpendicular to their respective common conductors.

7. A photoresponsive unit comprising in combination, a base member of insulating material having a flat surface, means mounting a plurality of elongated monocrystals of cadmium sulphide having a pair of substantially flat surfaces larger than any of the other surfaces with one of said larger surfaces on the flat surface of said base member with the longitudinal axes of said crystals substantially parallel thereby providing a large area responsive to illumination, first and second common conductors mounted to said body and disposed along opposite sides of said illumination responsive area and parallel to said crystal axes, a first plurality of spaced conductors extending across and in contact with an upper surface of a plurality of said monocrystals in a direction substantially perpendicular to and connected at one end to the first common conductor, and a second plurality of spaced conductors each located between adjacent ones of said first plurality of spaced conductors and extending across and in contact with an upper surface of a plurality of said monocrystals in a direction substantially perpendicular to and connected at one end to the second common conductor.

References Cited in the file of this patent

UNITED STATES PATENTS

| | | |
|---|---|---|
| 2,375,677 | Moore | May 8, 1945 |
| 2,448,517 | Cashman | Sept. 7, 1948 |
| 2,540,490 | Rittner | Feb. 6, 1951 |
| 2,668,867 | Eckstein | Feb. 9, 1954 |
| 2,672,528 | Shockley | Mar. 16, 1954 |
| 2,688,564 | Forgue | Sept. 7, 1954 |
| 2,773,992 | Ullery | Dec. 11, 1956 |
| 2,779,811 | Picciano | Jan. 29, 1957 |
| 2,789,193 | Anderson | Apr. 16, 1957 |
| 2,813,957 | Gosling | Nov. 19, 1957 |
| 2,848,651 | Byrne | Aug. 19, 1958 |
| 2,853,652 | Howell | Sept. 23, 1958 |

OTHER REFERENCES

R. W. Smith: Some Aspects of the Photo-Conductivity of Cadmium Sulfide, reprinted from RCA Review, September 1951, vol. XII, No. 3.